United States Patent Office 3,087,856
Patented Apr. 30, 1963

3,087,856
COMPOSITION FOR COMBATTING COCCIDIOSIS
AND METHOD OF USING SAME
Phillip Paul Actor, Franklin Park, Richard Willis Semar, New Brunswick, and Joseph Frank Pagano, Somerville, N.J., assignors to Olin Mathieson Chemical Corporation, New York, N.Y., a corporation of Virginia
No Drawing. Filed May 31, 1961, Ser. No. 113,611
16 Claims. (Cl. 167—53.1)

This invention relates to a poultry feed composition for combatting coccidiosis.

Coccidiosis is a disease affecting primarily poultry and is caused by protozoa of the genus Eimeria, especially E. tenella, E. necatrix and E. acervulina. This disease causes severe and frequently fatal infection in poultry flocks. It constitutes a serious economic hazard.

Current practice in poultry raising is the feeding of coccidiostatic preparations in the general diet as a prophylactic measure. Known coccidiostats have failings in that they are not as highly effective as desirable, do not exert their effect against all species of infective organisms, are not free of undesirable side effects and/or are not economically feasible. It is an object of this invention to provide a composition which prevents the development and spread of coccidiosis effectively at low, economical levels.

It has been found, according to this invention, that a combination of compounds is effective at low concentration in combatting coccidiosis in poultry due to various species of Eimeria. Evidence is available which shows that this combination of substances not only is effective in preventing the development and spread of coccidiosis to an extent greater than the individual compounds themselves, but the combination is also effective against species of Eimeria which do not respond to the compounds singly or in mixed infections due to more than one species of protozoa. The combination is also singularly free of undesirable side effects.

The composition of this invention comprises a combination of a dinitrobenzamide or dinitrotoluamide, e.g. 3,5-dinitrobenzamide or 3,5-dinitrotoluamide, together with a tetraalkylthiuram disulfide or monosulfide in coccidiostatic amount together with a major proportion of carrier or diluent. Outstanding and preferred in the respective groups are combinations of 3,5-dinitrobenzamide and tetraethylthiuram disulfide or 3,5-dinitrotoluamide and tetraethylthiuram disulfide with the former most preferred. The 3,5-dinitrotoluamide is preferably the o-toluamide. The amount of amide and sulfide required for control of coccidiosis is very low. A total of 0.005 to 0.10% (by weight) of the two substances in the feed is adequate to achieve the purpose desired. Preferably the range lies between 0.025 and 0.05%. Approximately equal proportions (percent by weight) of the two synergistic components give best results, but a ratio of about 1 to 3 parts of the amide to about 1 to 3 parts of tetraalkylthiuram sulfide may be used to good effect.

The composition of this invention may be produced by intimately dispersing the active ingredients throughout a carrier or diluent which is either solid or liquid. Preferably, the two compounds are thoroughly admixed with a major proportion of poultry feed supplied to the fowl, e.g. chick starter, broiler and grower feeds, laying mashes, breeder and turkey breeder mashes, turkey starter and grower feeds and the like.

The two compounds may also be incorporated in premixes wherein higher proportions of the active ingredients are present. The concentrated premix is then diluted with additional feed by the feed supplier or poultry grower, for example one pound of premix per ton of feed, to obtain a feed containing the proportions of active substance described previously.

It will also be appreciated that the active ingredients may be supplied in combination with an inert carrier or diluent such as Attapulgus clay, bentonite or edible vegetable materials. Liquid dispersions in water can be prepared by using emulsifiers and/or surface active agents.

The coccidiostatic activity of the combination of compounds is demonstrated by the following experimental results:

A basal ration having the following composition was used:

Meat and bone scrap
Fish meal
Vitamin $B_{12}$
Poultry by-product meal
Dehulled soybean oil meal
Dehydrated alfalfa meal
Corn gluten meal
Pulverized oats
Ground barley
Corn meal
Wheat middlings
Dried grain and whey fermentation solubles
Methionine hydroxy analogue calcium
Riboflavin
Calcium pantothenate
Choline chloride
Niacin
Animal fat
Menadione sodium bisulfite
Vitamin E supplement
Butylated hydroxytoluene
Vitamin A palmitate
D-activated animal sterol
Calcium carbonate
Defluorinated phosphate
Salt
Calcium iodate
Manganese oxide
Zinc oxide
Cobalt hydroxide
Cobalt carbonate Groups of 3-week old chicks were fed the basal ration ad libitum. A normal control (uninfected) group was fed the basal ration alone. An infection control group was also fed only basal ration. Additional groups were fed daily diets composed of the basal ration having intimately admixed therewith the proportions indicated in the following tables of 3,5-dinitrobenzamide alone, 3,5-dinitro-o-toluamide alone or tetraethylthiuram disulfide alone, or a combination of either 3,5-dinitrobenzamide or 3,5-dinitro-o-toluamide plus tetraethylthiuram disulfide. The chicks in all groups except the normal control group were infected with the species of Eimeria indicated in the tables.

In all of the studies reported below, the compounds in their appropriate levels were incorporated into the diet and fed from one-day pre-infection to seven days post-infection. After the diets were administered for eight days, the studies were terminated. After being weighed, the birds were sacrificed and the lesion score was determined by examining the infected organs macroscopically. The following tables show the results of the studies described. In these tables the symbols "3,5-D," "3,5-T" and "TE" are used to refer to 3,5-dinitrobenzamide, 3,5-dinitro toluamide and tetraethylthiuram disulfide respectively.

The following tables show the effect of 3,5-D and TE on Eimeria infections.

TABLE I

*Effect of 3,5-D and TE on Eimeria necatrix Infection*

| Compound | Compound level (percent of diet) | Avg. compound per bird (mgs.) | Percent infection |
|---|---|---|---|
| Normal control (uninfected) | | | 0 |
| Infection control | | | 93 |
| 3,5-D | 0.025 | 58.5 | 27 |
| TE | 0.010 | 22.0 | 73 |
| TE | 0.005 | 11.4 | 87 |
| 3,5-D plus | 0.025 | 59.5 | 0 |
| TE | 0.010 | 23.8 | |
| 3,5-D plus | 0.025 | 58.0 | 13 |
| TE | 0.005 | 11.6 | |

TABLE II

*Effect of 3,5-D and TE on Eimeria tenella Infection*

| Compound | Compound level (percent of diet) | Avg. compound per bird (mgs.) | Percent infection |
|---|---|---|---|
| Normal control | | | 0 |
| Infection control | | | 77.5 |
| 3,5-D | 0.025 | 57.5 | 40.0 |
| TE | 0.010 | 25.3 | 30.0 |
| 3,5-D plus | 0.025 | 63.3 | 5.0 |
| TE | 0.010 | 25.3 | |

TABLE III

*Effect of 3,5-D and TE on Eimeria acervulina Infection*

| Compound | Compound level (percent of diet) | Avg. compound per bird (mgs.) | Percent infection |
|---|---|---|---|
| Normal control (uninfected) | | | 0 |
| Infection control | | | 75 |
| 3,5-D | 0.025 | 59.0 | 60 |
| TE | 0.010 | 25.0 | 45 |
| 3,5-D plus | 0.025 | 55.9 | 2.5 |
| TE | 0.010 | 22.4 | |

The following table shows the effect of 3,5-D and TE on mixed coccidia infection.

TABLE IV

*Effect of 3,5-D and TE on a Mixed Coccidia Infection*

| Compound | Compound level (percent of diet) | Percent infection E. tenella | Percent infection E. acervulina |
|---|---|---|---|
| Infection control [1] | | 73 | 78 |
| 3,5-D | 0.025 | 40 | 55 |
| 3,5-D | 0.005 | 75 | 50 |
| TE | 0.020 | 10 | 65 |
| TE | 0.010 | 13 | 55 |
| TE | 0.010 | 40 | 80 |
| 3,5-D plus | 0.025 | 0 | 0 |
| TE | 0.020 | | |
| 3,5-D plus | 0.025 | 0 | 2.5 |
| TE | 0.010 | | |
| 3,5-D plus | 0.025 | 15 | 15 |
| TE | 0.001 | | |
| 3,5-D plus | 0.005 | 5 | 10 |
| TE | 0.020 | | |
| 3,5-D plus | 0.005 | 0 | 0 |
| TE | 0.010 | | |
| 3,5-D plus | 0.005 | 10 | 55 |
| TE | 0.001 | | |

[1] Mixed Infection: *E. tenella* plus *E. acervulina*.

TABLE V

*Effect of 3,5-T and TE on Eimeria tenella Infection*

| Compound | Compound level (percent of diet) | Avg. compound per bird (mgs.) | Percent infection |
|---|---|---|---|
| Infection control | | | 70 |
| 3,5-T | 0.0125 | 31.6 | 15 |
| 3,5-T | 0.0050 | 15.0 | 45 |
| TE | 0.0100 | 27.6 | 20 |
| TE | 0.0010 | 2.2 | 65 |
| 3,5-T plus | 0.0125 | 33.7 | 0 |
| TE | 0.0100 | 27.0 | |
| 3,5-T plus | 0.0125 | 33.3 | 0 |
| TE | 0.0010 | 2.6 | |
| 3,5-T plus | 0.0050 | 12.9 | 0 |
| TE | 0.0100 | 25.8 | |
| 3,5-T plus | 0.0050 | 15.0 | 10 |
| TE | 0.0010 | 3.0 | |

The above data show that the combination of 3,5-dinitrobenzamide or 3,5-dinitrotoluamide and tetraethylthiuram disulfide exhibit synergism in their effect against various Eimeria infections. The combination gives results superior to those obtained with either of the compounds alone and in excess of the additive effect. As will be seen from Table III, the individual compounds alone show, at best, only poor activity against *E. acervulina*, whereas the combination of the two compounds results in a high order of activity. Table IV provides evidence of the synergistic effect of the combination of the two compounds against a mixed coccidia infection (*E. tenella* and *E. acervulina*). None of the compounds, by themselves or in combination, give evidence of toxicity. The added efficacy of the combinations of two compounds cannot be attributed to greater intake as the average consumption of groups fed the combination was comparable to that for the groups fed the compound singly.

What is claimed is:

1. A feed composition comprising a major proportion of animal feed containing intimately admixed therein a tetraalkylthiuram sulfide and a member of the group consisting of 3,5-dinitrobenzamide and 3,5-dinitrotoluamide.

2. A composition as in claim 1 wherein the sulfide and dinitro compound comprise 0.005 to 0.10% by weight of the feed composition.

3. A composition as in claim 1 wherein the sulfide and dinitro compound comprise 0.025 to 0.05% by weight of the feed composition.

4. A poultry feed composition for combatting coccidiosis comprising poultry feed having intimately admixed therewith tetraethylthiuram disulfide and 3,5-dinitrobenzamide.

5. A poultry feed composition for combatting coccidiosis comprising poultry feed having intimately admixed therewith tetraethylthiuram disulfide and 3,5-dinitrotoluamide.

6. A poultry feed composition for combatting coccidiosis comprising a basal ration having intimately admixed therewith 0.005 to 0.10% by weight of tetraethylthiuram disulfide and 3,5-dinitrobenzamide.

7. A poultry feed composition for combatting coccidiosis comprising a basal ration having intimately admixed therewith 0.005 to 0.10% by weight of tetraethylthiuram disulfide and 3,5-dinitrotoluamide.

8. A poultry feed composition for combatting coccidiosis comprising 0.0125% by weight of 3,5-dinitrobenzamide and 0.025% by weight of tetraethylthiuram disulfide.

9. A poultry feed composition for combatting coccidiosis comprising 0.025% by weight of 3,5-dinitrobenzamide and 0.025% by weight of tetraethylthiuram disulfide.

10. A composition for combatting coccidiosis comprising a tetraalkylthiuram sulfide and a member of the group consisting of 3,5-dinitrobenzamide and 3,5-dinitrotoluamide.

11. A composition for combatting coccidiosis comprising 3,5-dinitrobenzamide and tetraethylthiuram disulfide.

12. A composition for combatting coccidiosis comprising 3,5-dinitrotoluamide and tetraethylthiuram disulfide.

13. A method for combatting coccidiosis in poultry which comprises administering to the poultry a composition comprising a tetraalkylthiuram sulfide and a member of the group consisting of 3,5-dinitrobenzamide and 3,5-dinitrotoluamide.

14. A method for combatting coccidiosis in poultry which comprises administering to the poultry a composition comprising 3,5-dinitrobenzamide and tetraethylthiuram disulfide.

15. A method for combatting coccidiosis which comprises administering a feed composition comprising a basal ration having intimately admixed therewith 0.005 to 0.10% by weight of tetraethylthiuram disulfide and 3,5-dinitrobenzamide.

16. A method for combatting coccidiosis which comprises administering a feed composition comprising a basal ration having intimately admixed therewith 0.005 to 0.10% by weight of tetraethylthiuram disulfide and 3,5-dinitrotoluamide.

References Cited in the file of this patent
UNITED STATES PATENTS

| | | |
|---|---|---|
| 2,610,140 | Santivasi | Sept. 9, 1952 |
| 3,015,606 | Walde | Jan. 2, 1962 |